(12) United States Patent
Hickey et al.

(10) Patent No.: US 11,767,063 B2
(45) Date of Patent: Sep. 26, 2023

(54) EXTENDED ROOF REINFORCEMENT STRUCTURE

(71) Applicant: Ford Global Technologies, LLC, Dearborn, MI (US)

(72) Inventors: Joseph Prescott Hickey, Westland, MI (US); Christopher John May, Novi, MI (US); Michael Kozak, Canton, MI (US); Jamil M. Alwan, Ann Arbor, MI (US); Chelliah Madasamy, Canton, MI (US); Matthew B. Makowski, Northville, MI (US); Mazhar Mohammed Hussain, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 17/463,613

(22) Filed: Sep. 1, 2021

(65) Prior Publication Data
US 2021/0394832 A1 Dec. 23, 2021

Related U.S. Application Data

(63) Continuation of application No. 16/798,786, filed on Feb. 24, 2020, now Pat. No. 11,136,065.

(51) Int. Cl.
| | | |
|---|---|---|
| *B62D 25/04* | (2006.01) | |
| *B62D 25/08* | (2006.01) | |
| *B62D 27/02* | (2006.01) | |
| *B62D 25/02* | (2006.01) | |
| *B62D 25/06* | (2006.01) | |
| *B21D 53/74* | (2006.01) | |
| *B21D 47/01* | (2006.01) | |

(52) U.S. Cl.
CPC ........... *B62D 25/04* (2013.01); *B62D 25/025* (2013.01); *B62D 25/06* (2013.01); *B62D 25/08* (2013.01); *B62D 27/023* (2013.01); *B21D 47/01* (2013.01); *B21D 53/74* (2013.01)

(58) Field of Classification Search
CPC ...... B62D 25/04; B62D 25/08; B62D 27/023; B62D 27/065
USPC ........ 296/193.06, 203.01, 2, 193.09, 29, 30, 296/205
See application file for complete search history.

(56) References Cited

U.S. PATENT DOCUMENTS

| | | |
|---|---|---|
| 4,270,793 A | 6/1981 | Harasaki |
| 4,545,612 A | 10/1985 | Harasaki |
| 4,807,925 A | 2/1989 | Sakamoto et al. |
| 5,213,391 A | 5/1993 | Takagi |
| 5,303,973 A | 4/1994 | Fujii |
| 5,586,799 A | 12/1996 | Kanemitsu et al. |
| 5,785,378 A | 7/1998 | Seefried et al. |
| 5,795,014 A | 8/1998 | Balgaard |
| 6,073,992 A | 6/2000 | Yamauchi et al. |
| 6,139,093 A | 10/2000 | Elliot et al. |

(Continued)

*Primary Examiner* — Dennis H Pedder
(74) *Attorney, Agent, or Firm* — Todd W. Dishman; Carlson, Gaskey & Olds, P.C.

(57) ABSTRACT

This disclosure relates to a motor vehicle, and in particular a vehicle body structure for a motor vehicle, with an extended roof reinforcement structure. An example vehicle includes an A-pillar, a roof side rail, a dash panel, and a reinforcement structure extending at least partially through the roof side rail and the A-pillar to a front end forward of the dash panel.

18 Claims, 2 Drawing Sheets

(56) References Cited

U.S. PATENT DOCUMENTS

| | | |
|---|---|---|
| 6,322,124 B1 | 11/2001 | Kim |
| 6,467,834 B1 | 10/2002 | Barz et al. |
| 6,578,909 B1 | 6/2003 | Reed et al. |
| 6,648,404 B2 | 11/2003 | Yakata et al. |
| 6,921,130 B2 | 7/2005 | Barz et al. |
| 7,083,224 B2 | 8/2006 | Yamamura et al. |
| 7,125,461 B2 | 10/2006 | Czaplicki et al. |
| 7,731,272 B2 | 6/2010 | Moore et al. |
| 7,758,107 B2 | 7/2010 | Ratsos et al. |
| 7,845,716 B2 | 12/2010 | Kiyotake et al. |
| 8,215,674 B2 | 7/2012 | Persson |
| 8,262,152 B2 | 9/2012 | Okumura et al. |
| 8,282,154 B2 | 10/2012 | Maruyama |
| 8,382,195 B2 | 2/2013 | Iwase et al. |
| 8,491,047 B1 | 7/2013 | Moll |
| 9,090,291 B1 | 7/2015 | Kanagai et al. |
| 9,187,135 B1 * | 11/2015 | Redmer ................ B62D 25/04 |
| 9,193,405 B2 | 11/2015 | Pohl et al. |
| 9,248,862 B1 | 2/2016 | Redmer et al. |
| 9,296,431 B1 | 3/2016 | Aghssa et al. |
| 9,610,981 B1 | 4/2017 | Bach et al. |
| 9,637,175 B2 | 5/2017 | Bogachuk et al. |
| 9,718,500 B2 | 8/2017 | Lee |
| 9,815,498 B2 | 11/2017 | Yamamoto et al. |
| 9,988,087 B2 | 6/2018 | Yamamoto |
| 10,526,020 B2 | 1/2020 | Narahara et al. |
| 10,597,090 B2 * | 3/2020 | Son ................ B62D 25/04 |
| 11,136,065 B2 * | 10/2021 | Hickey ................ B62D 25/02 |
| 2003/0102695 A1 | 6/2003 | Kim |
| 2006/0202520 A1 | 9/2006 | Osterberg et al. |
| 2015/0084373 A1 | 3/2015 | Nagasawa |
| 2015/0375800 A1 | 12/2015 | Wagner et al. |
| 2016/0039466 A1 | 2/2016 | Yamamoto et al. |
| 2016/0039471 A1 | 2/2016 | Bach et al. |
| 2017/0313358 A1 | 11/2017 | Narahara et al. |
| 2018/0237072 A1 | 8/2018 | Jun et al. |
| 2019/0039553 A1 | 2/2019 | Komura et al. |

\* cited by examiner

EXTENDED ROOF REINFORCEMENT STRUCTURE

RELATED APPLICATIONS

This application is a continuation of prior U.S. application Ser. No. 16/798,786, filed Feb. 24, 2020, the entirety of which is herein incorporated by reference.

TECHNICAL FIELD

This disclosure relates to a motor vehicle, and in particular a vehicle body structure for a motor vehicle, with an extended roof reinforcement structure.

BACKGROUND

Motor vehicles include doors configured to open and close relative to openings in a body structure of the vehicle. Commonly, driver and front-passenger doors are configured to open and close relative to openings that are circumscribed by a sill, a hinge pillar, an A-pillar, a roof side rail, and a B-pillar. Some known vehicles include reinforcement structures within a roof side rail and an A-pillar.

SUMMARY

A motor vehicle according to an exemplary aspect of the present disclosure includes, among other things, an A-pillar, a roof side rail, a dash panel, and a reinforcement structure extending at least partially through the roof side rail and the A-pillar to a front end forward of the dash panel.

In a further non-limiting embodiment of the foregoing motor vehicle, the reinforcement structure includes a first section extending from a rear end along a first axis to a curved section, and a second section extending from the curved section to the front end along a second axis inclined relative to the first axis.

In a further non-limiting embodiment of any of the foregoing motor vehicles, at least a segment of the second section is straight.

In a further non-limiting embodiment of any of the foregoing motor vehicles, the front end is vertically below a top of a hinge pillar.

In a further non-limiting embodiment of any of the foregoing motor vehicles, the front end is vertically below the top of the hinge pillar by about 95 mm.

In a further non-limiting embodiment of any of the foregoing motor vehicles, the reinforcement structure is a tube.

In a further non-limiting embodiment of any of the foregoing motor vehicles, the reinforcement structure is made using a roll-forming process.

In a further non-limiting embodiment of any of the foregoing motor vehicles, the reinforcement structure is made of a steel material.

In a further non-limiting embodiment of any of the foregoing motor vehicles, the reinforcement structure is made of a martensitic steel.

In a further non-limiting embodiment of any of the foregoing motor vehicles, the first section is within the roof side rail.

In a further non-limiting embodiment of any of the foregoing motor vehicles, the second section is partially within the A-pillar.

In a further non-limiting embodiment of any of the foregoing motor vehicles, the reinforcement structure is fastened to a side apron of the motor vehicle adjacent the front end.

In a further non-limiting embodiment of any of the foregoing motor vehicles, the reinforcement structure includes at least one aperture spaced rearward of the front end, and the at least one aperture is configured to receive a shank of a fastener.

In a further non-limiting embodiment of any of the foregoing motor vehicles, the at least one aperture includes a plurality of apertures, and a front-most one of the plurality of apertures is accessible via a hood opening of the motor vehicle.

In a further non-limiting embodiment of any of the foregoing motor vehicles, the reinforcement structure is a one-piece structure.

In a further non-limiting embodiment of any of the foregoing motor vehicles, the dash panel extends substantially normal to a centerline of the motor vehicle and provides a front boundary of a passenger cabin.

A vehicle body structure for a motor vehicle according to an exemplary aspect of the present disclosure includes, among other things, a reinforcement structure including a first section extending from a rear end to a curved section through a roof side rail along a first axis. The reinforcement structure further includes a second section extending from the curved section to a front end through an A-pillar along a second axis inclined relative to the first axis. Further, the front end is forward of a dash panel.

In a further non-limiting embodiment of the foregoing body structure, at least a segment of the second section is straight.

In a further non-limiting embodiment of any of the foregoing body structures, the front end is vertically below a top of a hinge pillar.

In a further non-limiting embodiment of any of the foregoing body structures, the reinforcement structure is a one-piece tube made of a martensitic steel.

DETAILED DESCRIPTION

This disclosure relates to a motor vehicle, and in particular a vehicle body structure for a motor vehicle, with an extended roof reinforcement structure. An example vehicle includes an A-pillar, a roof side rail, a dash panel, and a reinforcement structure extending at least partially through the roof side rail and the A-pillar to a front end forward of the dash panel. The disclosed arrangement improves pillar stiffness and helps absorb vehicle loads, and is particularly beneficial in vehicles with relatively tight packaging constraints, such as vehicles with a relatively short hinge pillar. The reinforcement structure may also be formed using traditional manufacturing techniques and using relatively high yield strength materials. These and other benefits will be appreciated from the below description.

Figure 1:
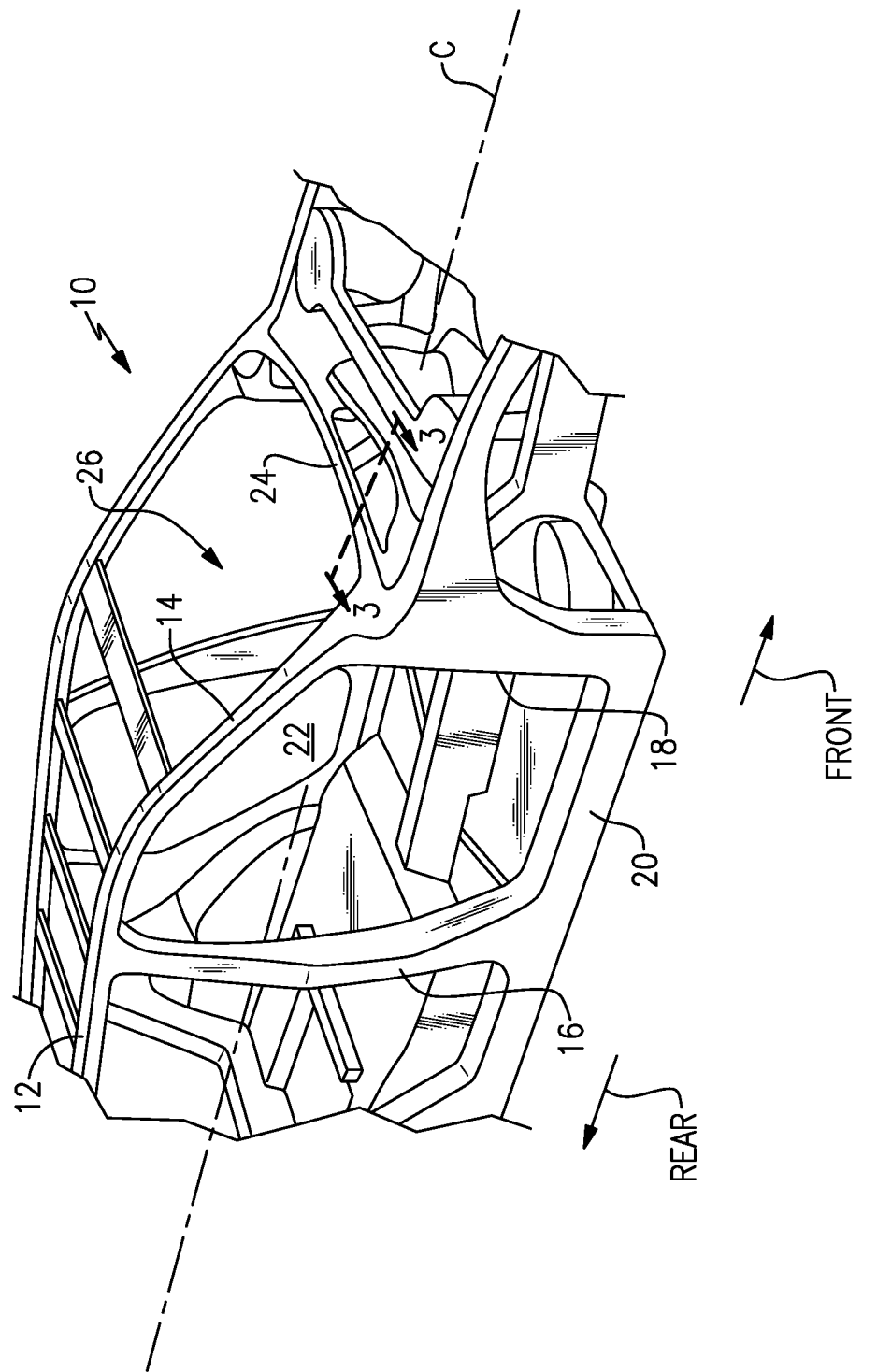
FIG. 1 is a side-perspective view of an example body structure for a motor vehicle.

FIG. 1 is a side-perspective view of a vehicle body structure 10 ("body structure 10") for a motor vehicle ("vehicle"). The body structure 10 includes, among other parts, a roof side rail 12, an A-pillar 14, a B-pillar 16, a hinge pillar 18 (which is sometimes referred to as an A-pillar tower reinforcement) configured to connect to a door hinge, and a sill 20. In FIG. 1, the roof side rail 12, A-pillar 14, B-pillar 16, hinge pillar 18, and sill 20 circumscribe an opening 22. Eventually, a passenger door is mounted to the hinge pillar 18 and is configured to selectively open and close relative to the opening 22. While the passenger side of the body structure 10 is shown and described relative to FIG. 1, it should be understood that the body structure 10 is substantially symmetrical about its centerline C, and that the body structure 10 includes substantially similar structures on the driver side of the body structure 10.

Between the passenger and driver sides of the body structure 10, the body structure 10 includes a dash panel 24, which includes a length dimension extending substantially normal to the centerline C. The dash panel 24 is a component of the body structure 10 that provides a front boundary of a passenger cabin 26. The "front" and "rear" directions are labeled in FIG. 1 for ease of reference. In one example, the dash panel 24 separates the passenger cabin 26 from an engine compartment. In other examples, such as when the body structure 10 is used in vehicles without an internal combustion engine, the dash panel 24 separates the passenger cabin 26 from a motor compartment and/or a front trunk ("frunk"). An instrument panel may be mounted to the dash panel 24.

Figure 2:
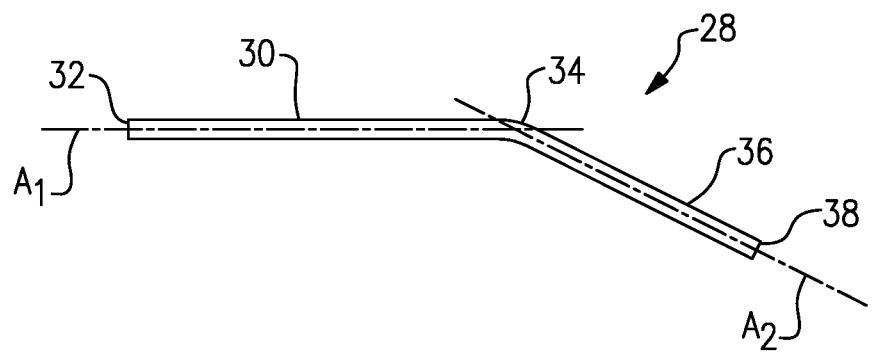
FIG. 2 is a side view of an example reinforcement structure.

The body structure 10 includes at least one roof reinforcement structure, and in particular both the passenger and driver sides of the body structure 10 include a roof reinforcement structure. An example reinforcement structure 28 is shown in FIG. 2 without the remainder of the body structure 10 for ease of reference. The term reinforcement structure is not used herein as a nonce term, and is not intended to serve as a replacement for means. Rather, the term is used herein to refer to structures configured to reinforce the body structure 10. To this end, the reinforcement structure 28 may be referred to simply as a reinforcement. In a particular example, the reinforcement structure 28 may be referred to as a tube or a reinforcement tube.

In FIG. 2, the reinforcement structure 28 has a length dimension including a first section 30 extending from a rear end 32 to a curved section 34. The curved section 34 may be a substantially gradual curve. The first section 30 is arranged within the roof side rail 12, in this disclosure. In an example, the first section 30 is connected to another portion of the body structure 10 using fasteners, such as bolts, screws, rivets, etc. The first section 30 is substantially straight and extends along a first axis $A_1$.

The length dimension of the reinforcement structure 28 further includes a second section 36 extending from the curved section 34 to a front end 38 along a second axis $A_2$ which is inclined relative to the first axis $A_1$. In an aspect of this disclosure, the entire second section 36 is straight. In other words, between the curved section 34 and the front end 38, there are no curves or bends in the second section 36. In another aspect of this disclosure, the second section 36 is substantially straight and a segment of the second section 36 between the front end 38 and a point between the front end 38 and the curved section 34 is entirely straight. In either arrangement, forces applied to the second section 36 are more effectively transferred rearwardly, along the length of the reinforcement structure 28, and absorbed by the body structure 10.

The entire reinforcement structure 28, in one example, is formed separately from the remainder of the body structure 10 and is formed as a one-piece structure. In one example, the reinforcement structure 28 is integrally formed as a single, continuous structure. In a particular example, the reinforcement structure 28 does not include any joints or seams, other than, in the example where the reinforcement structure 28 is roll formed, a longitudinal seam extending along the entire length of the reinforcement structure 28. These arrangements reduce parts and eliminate manufacturing steps.

The reinforcement structure 28 is a hollow tube, in this example. In cross-section, the reinforcement structure 28 may be circular or non-circular. As examples, the reinforcement structure 28 may be elliptical or stadium-shaped in cross-section. The reinforcement structure 28 is formed by traditional manufacturing processes, such as roll forming. The curved section 34 may be formed by bending the reinforcement structure after it has been roll formed. Because the reinforcement structure 28 is formed by roll forming and bending as opposed to more complicated manufacturing techniques, such as hydroforming, and because the bend of the curved section 34 is relatively gradual (i.e., not sharp), the reinforcement structure 28 may be made of high yield strength materials. In one example, the reinforcement structure 28 is made of a high yield strength steel. In a further example, the reinforcement structure is made of a martensitic steel.

Figure 3:
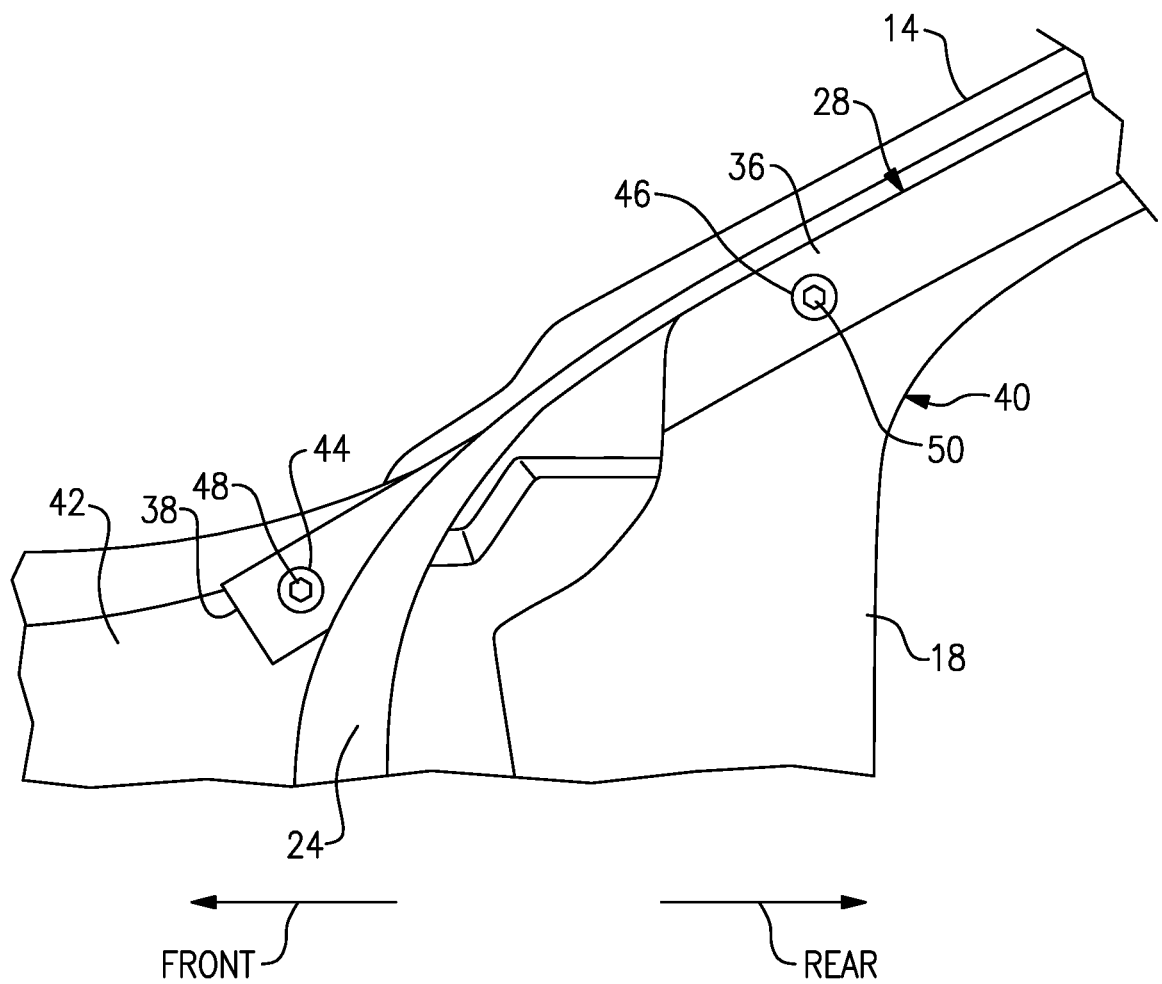
FIG. 3 is a cross-sectional view taken along line 3-3 from FIG. 1, and illustrates an example manner in which the reinforcement structure is mounted to the body structure.

The front end 38 is the front-most end of the reinforcement structure 28. In this disclosure, the reinforcement structure 28 is extended relative to known reinforcement structure such that, when the reinforcement structure 28 is mounted to the body structure 10, the front end 38 is forward of (i.e., in front of, relative to the "front" direction) the dash panel 24, as shown in FIG. 3. The segment of the reinforcement structure 28 extending forward of the dash panel 24 is entirely straight in one example. In particular, the front end 38 lies in a plane that is spaced forward of a plane which contains the dash panel 24. Further, the front end 38 is vertically below a top 40 of the hinge pillar 18. In one example the front end 38 is about 95 mm (3.74 in) vertically below the top 40.

The placement of the front end 38 forward of the dash panel 24 facilitates the transfer of loads rearwardly along the reinforcement structure 28. Loads applied to the reinforcement structure 28 adjacent the front end 38 are ultimately absorbed by the body structure 10 adjacent the rear end 32. The placement of the front end 38 vertically below the top 40 of the hinge pillar 18 provides for added stiffness of the A-pillar 14, and reduces a bending moment which may otherwise form adjacent the top 40 (i.e., at a junction between the A-pillar 14 and the hinge pillar 18), which, in some situations, is not a suitable location for absorbing loads. With the present disclosure, loads are transferred along the reinforcement structure 28 and absorbed by the body structure 10 at more suitable locations. Arranging the front end 38 as in this present disclosure not only facilitates load transfer and improves stiffness of the A-pillar, but also takes up less space adjacent the hinge pillar 18, which is beneficial in vehicles with a short (low height) hinge pillar, such as sport utility vehicles (SUVs) with a relatively high ground clearance.

The arrangement of the reinforcement structure 28 also facilitates attachment of the reinforcement structure 28 to the body structure 10. As shown in FIG. 3, adjacent the front end 38, the reinforcement structure 28 is attached to side apron 42 of the body structure 10. The reinforcement structure 28 includes at least one aperture, and in this example includes first and second apertures 44, 46, spaced rearward (i.e., to the "rear" direction) of the front end 38 and configured to receive a shank of a respective fastener 48, 50. The fasteners 48, 50 may be bolts, screws, rivets, etc.

In the example of FIG. 3, at least the front-most aperture 44 is accessible from forward of the dash panel 24 via a hood opening of the vehicle, which increases the ease of installing the reinforcement structure 28, namely by increasing the ease of installing at least the fastener 48. In FIG. 3, the second aperture 46 is accessible from rearward of the dash panel 24. This disclosure extends to other aperture arrangements. Further, the reinforcement structure 28 could be attached to the body structure 10 by other techniques, such as welding.

It should be understood that terms such as "about," "substantially," and "generally" are not intended to be boundary less terms, and should be interpreted consistent with the way one skilled in the art would interpret those terms. It should also be understood that directional terms such as "front," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
an A-pillar;
a roof side rail;
a dash panel; and
a reinforcement structure extending at least partially through the roof side rail and the A-pillar to a front end forward of the dash panel, wherein the front end is a tubular front end.

2. The motor vehicle as recited in claim 1, wherein:
the reinforcement structure includes a first section extending from a rear end along a first axis to a curved section, and a second section extending from the curved section to the front end along a second axis inclined relative to the first axis.

3. The motor vehicle as recited in claim 2, wherein at least a segment of the second section is straight.

4. The motor vehicle as recited in claim 2, wherein the front end is vertically below a top of a hinge pillar.

5. The motor vehicle as recited in claim 4, wherein the front end is vertically below the top of the hinge pillar by about 95 mm.

6. The motor vehicle as recited in claim 2, wherein the reinforcement structure is a tube.

7. The motor vehicle as recited in claim 6, wherein the reinforcement structure is made using a roll-forming process.

8. The motor vehicle as recited in claim 7, wherein the reinforcement structure is made of a steel material.

9. The motor vehicle as recited in claim 8, wherein the reinforcement structure is made of a martensitic steel.

10. The motor vehicle as recited in claim 2, wherein the first section is within the roof side rail.

11. The motor vehicle as recited in claim 10, wherein the second section is partially within the A-pillar.

12. The motor vehicle as recited in claim 11, wherein the reinforcement structure is fastened to a side apron of the motor vehicle adjacent the front end.

13. The motor vehicle as recited in claim 12, wherein:
the reinforcement structure includes at least one aperture spaced rearward of the front end, and
the at least one aperture is configured to receive a shank of a fastener.

14. The motor vehicle as recited in claim 13, wherein:
the at least one aperture includes a plurality of apertures, and
a front-most one of the plurality of apertures is accessible via a hood opening of the motor vehicle.

15. The motor vehicle as recited in claim 2, wherein the reinforcement structure is a one-piece structure.

16. The motor vehicle as recited in claim 1, wherein the dash panel extends substantially normal to a centerline of the motor vehicle and provides a front boundary of a passenger cabin.

17. The motor vehicle as recited in claim 1, wherein the reinforcement structure is a hollow tube.

18. The motor vehicle as recited in claim 1, wherein, in cross-section, the reinforcement structure is circular or non-circular.

* * * * *